(12) United States Patent
Choi et al.

(10) Patent No.: US 9,652,098 B2
(45) Date of Patent: May 16, 2017

(54) DISPLAY DEVICE INCLUDING TOUCH SENSOR

(71) Applicant: Samsung Display Co., Ltd., Yongin, Gyeonggi-Do (KR)

(72) Inventors: Moon Sung Choi, Incheon (KR); Ji Hong Park, Suwon-si (KR); Sang Min Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 115 days.

(21) Appl. No.: 14/595,936

(22) Filed: Jan. 13, 2015

(65) Prior Publication Data

US 2016/0098109 A1    Apr. 7, 2016

(30) Foreign Application Priority Data

Oct. 1, 2014    (KR) .......................... 10-2014-0132649

(51) Int. Cl.
*G06F 3/041*    (2006.01)
*G06F 3/044*    (2006.01)

(52) U.S. Cl.
CPC .... *G06F 3/044* (2013.01); *G06F 2203/04105* (2013.01)

(58) Field of Classification Search
CPC ..................... G06F 3/041; G06F 3/044; G06F 2203/04103; G06F 2203/04105; G06F 2203/04106
See application file for complete search history.

(56) References Cited

U.S. PATENT DOCUMENTS

| | | | |
|---|---|---|---|
| 6,369,865 B2* | 4/2002 | Hinata | G06F 3/0412 349/12 |
| 2011/0057899 A1* | 3/2011 | Sleeman | G01L 1/146 345/174 |
| 2011/0157087 A1* | 6/2011 | Kanehira | G06F 3/0414 345/174 |
| 2012/0098788 A1* | 4/2012 | Sekiguchi | G06F 3/044 345/174 |
| 2014/0055688 A1* | 2/2014 | Petcavich | G06F 3/0412 349/12 |

FOREIGN PATENT DOCUMENTS

| | | |
|---|---|---|
| KR | 10-2011-0075134 | 7/2011 |
| KR | 10-2012-0138892 | 12/2012 |
| KR | 10-2012-0139518 | 12/2012 |

* cited by examiner

*Primary Examiner* — Md Saiful A Siddiqui
(74) *Attorney, Agent, or Firm* — Innovation Counsel LLP

(57) ABSTRACT

The inventive concept relates to a display device including a touch sensor. More particularly, the inventive concept relates to a display device including a hybrid touch sensor for sensing a touch position and a touch pressure. The display device includes: a display panel for displaying an image; and a touch sensor unit provided on the display panel, wherein the touch sensor unit includes a sensing electrode layer including a first touch sensor and a pressure sensing electrode, a conductor, and an elastic layer provided between the sensing electrode layer and the conductor, the first touch sensor includes a plurality of touch electrodes for sensing a touch position, the plurality of touch electrodes including a transparent conductive material, and the pressure sensing electrode, the conductor, and the elastic layer form a second touch sensor for sensing a touch pressure by a foreign object.

19 Claims, 14 Drawing Sheets

DISPLAY DEVICE INCLUDING TOUCH SENSOR

CROSS-REFERENCE TO RELATED APPLICATION

This application claims priority to and the benefit of Korean Patent Application No. 10-2014-0132649 filed in the Korean Intellectual Property Office on Oct. 1, 2014, the entire contents of which are incorporated herein by reference.

BACKGROUND (a) Technical Field

The inventive concept relates to a display device including a touch sensor. More particularly, the inventive concept relates to a display device including a hybrid touch sensor for sensing a touch position and a touch pressure.

(b) Description of the Related Art

Display devices such as a liquid crystal display and an organic light emitting display, portable transmission devices, and other information processing devices perform a function by using various input devices. Recently, as the input device, input devices including a touch sensing device have been frequently used.

A touch sensing function is used to find contact information such as whether an object approaches or touches a screen and a touch location thereof by sensing changes in pressure, charges, light, and the like which are applied to the screen of the display device, when the user writes text or draws figures by approaching or touching the screen using a finger or a touch pen. The display device receives an image signal based on the contact information to display an image.

Such a touch sensing function may be implemented through a touch sensor. The touch sensor may be classified into various types such as a resistive type, a capacitive type, an electromagnetic resonance (EMR) type, and an optical type.

For example, in the case of the resistive type touch sensor, two electrodes that face each other and are separated from each other may contact each other by pressure caused by an external object. When the two electrodes contact each other, a contact position is known by recognizing changes of voltage induced by changes of resistance at the position.

For example, the capacitive type of touch sensor includes a sensing capacitor formed by a plurality of sensing electrodes which may transfer sensing signals, and senses a change in capacitance of the sensing capacitor generated when a conductor such as a finger approaches the touch sensor to determine existence of a touch, a touch position, and the like. Regarding the capacitance type of touch sensor, a touch is sensed when a user contacts a touch screen, and a contact by a conductive object is needed.

The touch sensor may be built in the display device (i.e., in-cell type) or be formed outside of the display device (i.e., on-cell type). An additional touch sensor panel may be attached to the display device (i.e., add-on cell type).

The above information disclosed in this Background section is only for enhancement of understanding of the background of the invention and therefore it may contain information that does not form the prior art that is already known in this country to a person of ordinary skill in the art.

SUMMARY

The inventive concept has been made in an effort to provide a touch sensor for sensing a touch position and a touch pressure.

The inventive concept has been made in another effort to reduce a cost for manufacturing a touch sensor for sensing a touch position and a touch pressure, minimizing addition of a layer for sensing the touch pressure, and thereby making the touch sensor slimmer.

An exemplary embodiment of the inventive concept provides a display device including: a display panel for displaying an image; and a touch sensor unit provided on the display panel, wherein the touch sensor unit includes a sensing electrode layer including a first touch sensor and a pressure sensing electrode, a conductor, and an elastic layer provided between the sensing electrode layer and the conductor, the first touch sensor includes a plurality of touch electrodes for sensing a touch position, the plurality of touch electrodes including a transparent conductive material, and the pressure sensing electrode, the conductor, and the elastic layer form a second touch sensor for sensing a touch pressure.

The first touch sensor and the pressure sensing electrode are provided on a same layer, the plurality of touch electrodes are provided in a touch region facing a display area in which the display panel displays an image, and the pressure sensing electrode is provided in a peripheral area that surrounds the touch region.

The elastic layer is provided in the touch region and the peripheral area.

The elastic layer includes an elastic polarizer.

The conductor is provided in the peripheral area.

The display device further includes a cover window attached to the touch sensor unit through an adhesive, wherein the adhesive does not overlap the conductor.

The conductor is provided in the peripheral area and the touch region.

The display device further includes a cover window attached to the touch sensor unit through an adhesive, wherein the adhesive is provided between the conductor and the cover window.

The display device further includes a cover window attached to the touch sensor unit through an adhesive, wherein the conductor is formed on a bottom surface of the cover window, and the adhesive is provided between the conductor and the elastic layer.

The display device further includes a polarizer overlapping the elastic layer.

The elastic layer and the polarizer are provided between the conductor and the sensing electrode layer.

The display device further includes a cover window attached to the touch sensor unit through an adhesive, wherein the adhesive is provided between the elastic layer and the cover window and does not overlap the conductor.

The elastic layer is provided in the peripheral area.

The display device further includes a cover window attached to the touch sensor unit through an adhesive, wherein the conductor is provided on a bottom surface of the cover window, and the adhesive is provided between the conductor and the sensing electrode layer and in a region where the elastic layer is provided.

The display device further includes a polarizer overlapping the display area.

The display device further includes a cover window attached to the touch sensor unit through an adhesive and a polarizer overlapping the display area, wherein the conductor is provided in the peripheral area, the conductor is formed on a bottom surface of the cover window, and the adhesive does not overlap the conductor and the elastic layer.

According to the embodiment of the inventive concept, the touch sensor for sensing a touch position and a touch pressure is provided, the cost for manufacturing the touch sensor is reduced, and addition of the layer for sensing the touch pressure is minimized to thus make the touch sensor thinner.

DETAILED DESCRIPTION

Figure 1:
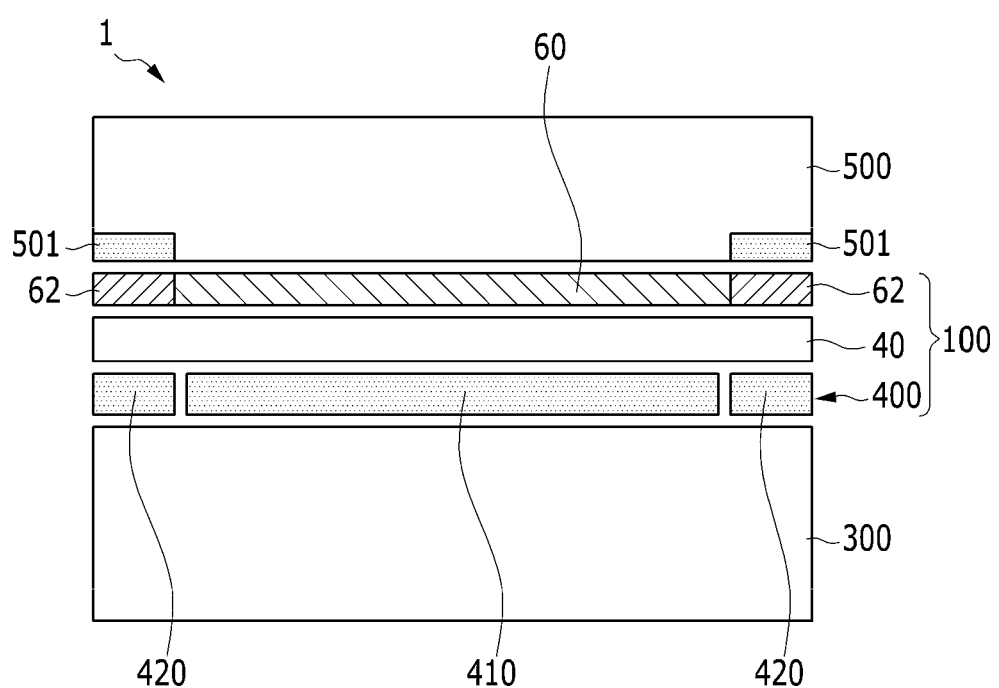
FIG. 1 shows a cross-sectional view of a display device including a touch sensor according to an exemplary embodiment of the inventive concept.

The inventive concept will be described more fully hereinafter with reference to the accompanying drawings, in which exemplary embodiments of the invention are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present between the element and the another element. In contrast, when an element is referred to as being "directly on" another element, there are no intervening elements present.

Parts that are unrelated to the description of the exemplary embodiments are omitted to make the description clear, and like reference numerals designate like element throughout the specification.

Throughout this specification and the claims that follow, when it is described that an element is "coupled" to another element, the element may be "directly coupled" to the other element or "electrically coupled" to the other element through a third element. Unless explicitly described to the contrary, the word "comprise" and variations such as "comprises" or "comprising" will be understood to imply the inclusion of stated elements but not the exclusion of any other elements.

A display device including a touch sensor according to an exemplary embodiment of the inventive concept will now be described with reference to FIG. 1 to FIG. 5.

Figure 2:
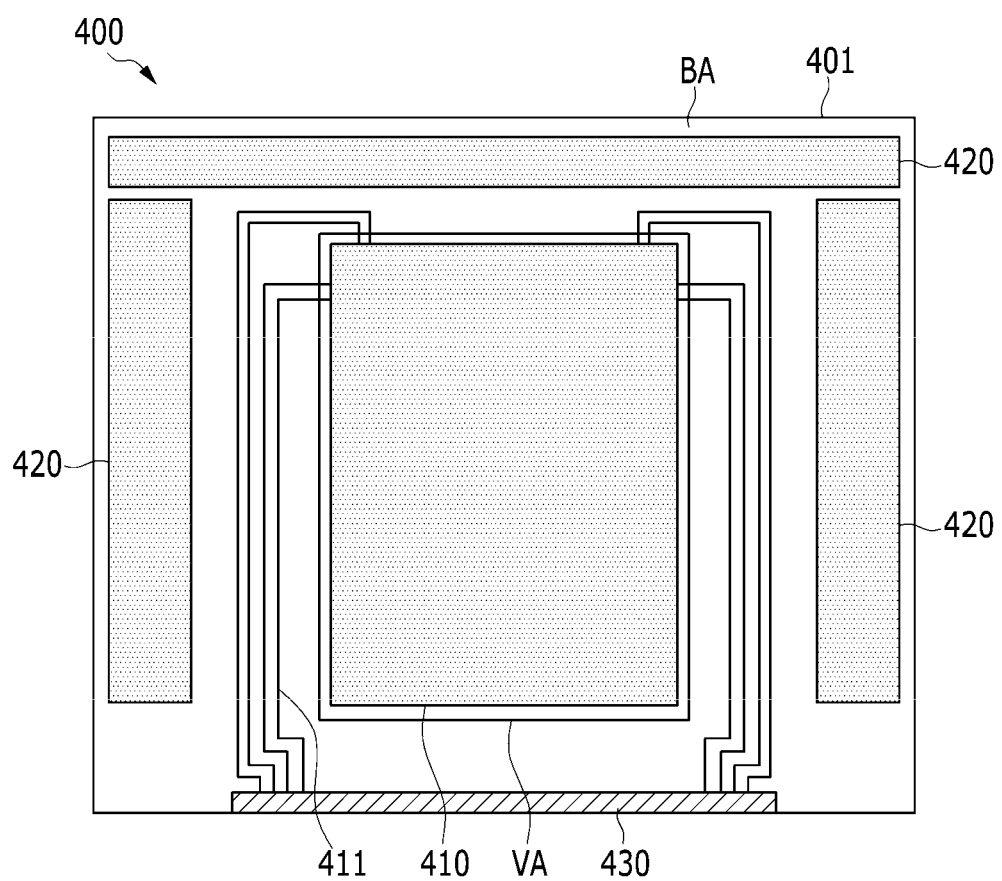
FIG. 2 shows a layout view of a sensing electrode layer of a touch sensor unit included by a display device according to an exemplary embodiment of the inventive concept.
Figure 3:
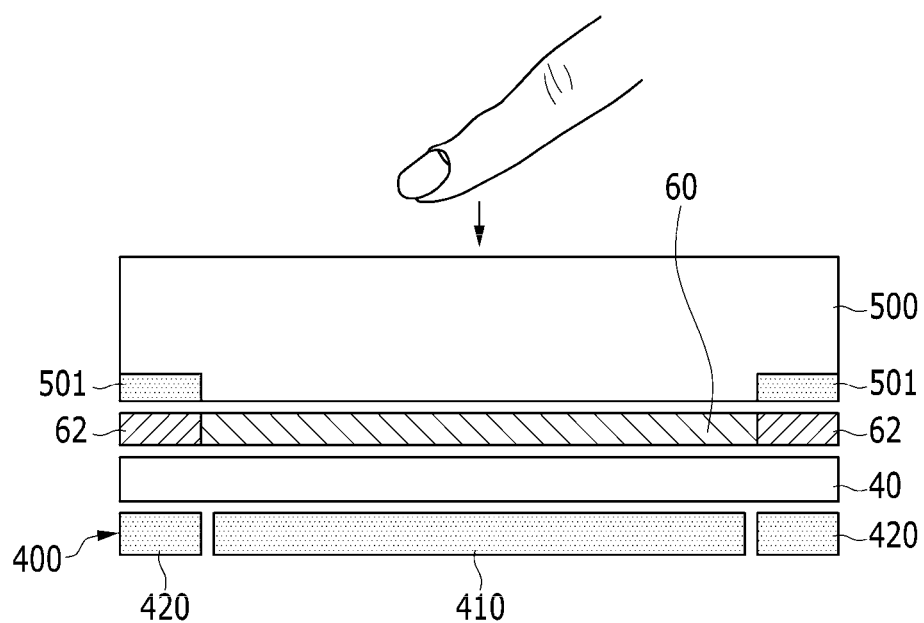
FIG. 3 shows a cross-sectional view of a touch sensor unit 100 according to an exemplary embodiment of the inventive concept when a foreign object contacts the display device.
Figure 4:
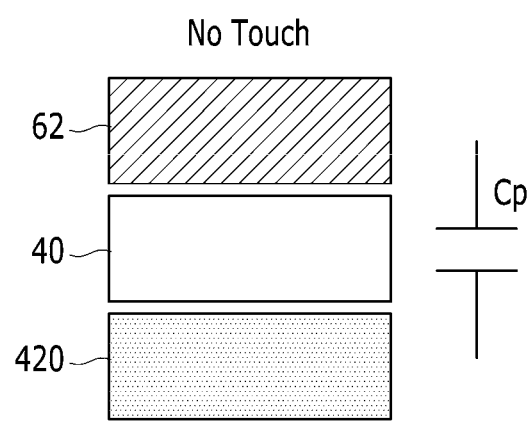
FIG. 4 shows a cross-sectional view of a second touch sensor for sensing a touch pressure when a foreign object does not contact a display device including a touch sensor according to an exemplary embodiment of the inventive concept.
Figure 5:
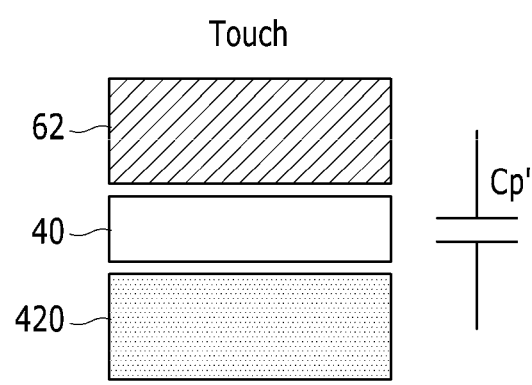
FIG. 5 shows a cross-sectional view of a deformed second touch sensor when a foreign object contacts a display device including a touch sensor according to an exemplary embodiment of the inventive concept.

FIG. 1 shows a cross-sectional view of a display device including a touch sensor according to an exemplary embodiment of the inventive concept, FIG. 2 shows a layout view of a sensing electrode layer of a touch sensor unit included by a display device according to an exemplary embodiment of the inventive concept, FIG. 3 shows a cross-sectional view of a touch sensor unit according to an exemplary embodiment of the inventive concept when a foreign object contacts the display device, FIG. 4 shows a cross-sectional view of a second touch sensor for sensing a touch pressure when a foreign object does not contact a display device including a touch sensor according to an exemplary embodiment of the inventive concept, and FIG. 5 shows a cross-sectional view of a deformed second touch sensor when a foreign object contacts a display device including a touch sensor according to an exemplary embodiment of the inventive concept.

Referring to FIG. 1, the display device 1 includes a touch sensor unit 100 and a display panel 300.

The display panel 300 includes a plurality of signal lines and a plurality of pixels connected to the plurality of signal lines, and displays images.

The plurality of pixels are provided in a display area for displaying the images. The plurality of pixels include at least one switching element connected to the signal line and at least one pixel electrode connected to the switching element. The switching element includes at least one thin film transistor and is controlled by the gate signal to transmit the data voltage to the pixel electrode. Each pixel displays the image with desired luminance according to the data voltage applied to the pixel electrode.

The image is displayed in an upper direction of the display panel 300 in the exemplary embodiment shown in FIG. 1.

For example, the display panel 300 is a liquid crystal panel or a panel including an organic light emitting element. The liquid crystal panel further includes a backlight unit for supplying light to the display panel 300. The backlight unit is provided on a lower side of the display panel 300 in the exemplary embodiment shown in FIG. 1.

The touch sensor unit 100 includes a sensing electrode layer 400, an elastic layer 40, and an upper conductor 62.

The sensing electrode layer 400 is provided on the display panel 300.

Referring to FIG. 1 and FIG. 2, the sensing electrode layer 400 includes a first touch sensor 410 for sensing a touch position when there is a contact or an access by a foreign object, and a second touch sensor which is pressure sensing electrodes 420 for sensing a touch pressure caused by the contact of the foreign object.

The first touch sensor 410 is provided in a touch region (VA) corresponding to the display area of the display panel 300.

The first touch sensor 410 can be various types of touch sensors, and for example, the first touch sensor 410 may be a capacitive type touch sensor. The first touch sensor 410 includes a plurality of touch electrodes (not shown) formed on at least one layer.

The touch electrode includes a transparent conductive material such as ITO, IZO, a metal nanowire, a conductive polymer, a metal mesh, or a thin metal layer.

When the first touch sensor 410 is a capacitive type touch sensor, a touch electrode of the first touch sensor 410 receives a sensing input signal from a driver, generates a sensing output signal that is changed by the contact, and transmits the sensing output signal to the driver.

When the touch electrode forms a self-sensing capacitor with a foreign object, the touch electrode receives the sensing input signal and is charged with a predetermined amount of charges, and when there is a contact by a foreign object such as a finger, the amount of charges stored in the self-sensing capacitor is changed and a sensing output signal that is different from the sensing input signal is output. Contact information such as a contact state or a contact position is known by the change of the sensing output signal.

When neighboring touch electrodes form a mutual-sensing capacitor, one touch electrode receives the sensing input signal from the driver and the self-sensing capacitor is charged with a predetermined amount of charges. When there is a contact by a foreign object such as a finger, the stored amount of charges of the self-sensing capacitor is changed and the changed amount of charges is output as a sensing output signal. The contact information such as a contact state or a contact position is known by the sensing output signal.

A plurality of touch electrodes may be formed on a same layer or different layers. The touch electrodes provided on different layers are provided on different sides of a substrate or a same side of the substrate.

The touch electrodes are connected to a pad 430 through a plurality of signal wires 411. The pad 430 is included in the sensing electrode layer 400. For example, the pad 430 may be made of the same material and may be formed on the same layer as the sensing electrode layer 400. Each signal wire 411 provides an input signal to the touch electrode or outputs an output signal to the driver through the pad 430. The driver is connected to the pad 430 in the form of a driving circuit chip, a circuit board, or a circuit film, and is provided in a peripheral area (BA) of the touch region (VA). The pad 430 is provided on one side of the peripheral area (BA), for example, a lower side of the touch region (VA) in which the pressure sensing electrodes are not formed as shown in FIG. 2

The signal wire 411 may be provided on a same layer as the sensing electrode layer 400. When the signal wire 411 is provided on the same layer as the sensing electrode layer 400, the signal wire 411 is formed with a same material and is formed through the same process as the touch electrode. The signal wire 411 may also be formed with a different material through a different process from the touch electrode.

The signal wire 411 is provided in the peripheral area (BA), and without being restricted to this, it can be provided in the touch region (VA).

The pressure sensing electrode 420 may be provided on a same layer as the first touch sensor 410, and in detail, the pressure sensing electrode 420 may be provided on the same layer as the touch electrode of the first touch sensor 410. The pressure sensing electrode 420 includes a same material as the touch electrode of the first touch sensor 410, and is formed by the same process as the touch electrode of the first touch sensor 410. However, without being restricted to this, the pressure sensing electrode 420 can include a non-transparent conductive material which is different from the touch electrode of the first touch sensor 410.

The pressure sensing electrode 420 is provided in the peripheral area (BA), and it is particularly provided on a side where the pad 430 is not provided. FIG. 2 shows an example of the pressure sensing electrode 420 formed in the peripheral area (BA) of the residual side except for the peripheral area (BA) in the lower portion where the pad 430 is provided, and without being restricted to this, the pressure sensing electrode 420 can be formed in any side of the peripheral area (BA).

The pressure sensing electrode 420 is connected to the pad 430 through a signal wire (not shown). The signal wire connected to the pressure sensing electrode 420 inputs an input signal to the pressure sensing electrode 420 and outputs an output signal to the driver through the pad 430. The signal wire is provided in the peripheral area (BA).

The sensing electrode layer 400 may be directly formed on a substrate 401 of the display panel 300 (as the on-cell type). When the sensing electrode layer 400 is directly formed on the display panel 300, no gap is generated between the sensing electrode layer 400 and the display panel 300 to minimize distortion of coordinates of a touch position sensed by the first touch sensor 410 and the display panel 300 may acquire accurate contact information. However, the sensing electrode layer 400 may be formed on a substrate 401 of the display panel 300 with intervening layers.

According to another exemplary embodiment of the inventive concept, the sensing electrode layer 400 may be formed on an additional circuit board and is attached to the display panel 300. The circuit board is formed of glass or plastic such as polyimide and is flexible or rigid.

The upper conductor 62 is provided on the elastic layer 40, and as shown in FIG. 1, it is provided at a place that faces the pressure sensing electrode 420 of the sensing electrode layer 400. In this case, the upper conductor 62 is provided in the peripheral area (BA).

The upper conductor 62 is formed on the elastic layer 40. The upper conductor 62 is formed of a transparent conductive material or a non-transparent conductive material.

The elastic layer 40 is provided between the upper conductor 62 and the sensing electrode layer 400. The elastic layer 40 has elastic force which may return to its original shape after being deformed by an external pressure.

The elastic layer 40 according to an exemplary embodiment of the inventive concept may have a polarization function and may be an elastic polarizer. In this case, the elastic layer 40 overlaps the display area of the display panel 300.

When the display panel 300 is a liquid crystal panel, a polarizer is generally needed on an upper portion of the display panel 300. The polarizer passes light of a specific polarization and blocks light of other polarizations, thus enables the liquid crystal panel 300 to display a desired image.

When the display panel 300 is an organic light emitting panel, the polarizer is disposed on the display panel 300 to reduce reflection of external light and increase quality of the displaying image.

The pressure sensing electrode 420, the elastic layer 40, and the upper conductor 62 form a second touch sensor that is a pressure sensor.

The second touch sensor will now be described with reference to FIG. 3 to FIG. 5.

FIG. 3 shows a cross-sectional view of a touch sensor unit 100 according to an exemplary embodiment of the inventive concept when a foreign object contacts the same, FIG. 4 shows a cross-sectional view of a second touch sensor for sensing a touch pressure when a foreign object does not contact a display device including a touch sensor according to an exemplary embodiment of the inventive concept, and FIG. 5 shows a cross-sectional view of a deformed second touch sensor when a foreign object contacts a display device including a touch sensor according to an exemplary embodiment of the inventive concept.

The second touch sensor precisely senses a touch pressure when a foreign object contacts the display device 1 and pressurizes it.

Referring to FIG. 4, when no contact of the foreign object is provided, no pressure is applied to the display device 1 in a vertical direction so the elastic layer 40 between the pressure sensing electrode 420 and the upper conductor 62 is not deformed. A sensing capacitor formed by the pressure sensing electrode 420 and the upper conductor 62 with the elastic layer 40 as a dielectric material has predetermined first capacitance Cp.

As shown in FIG. 3, when the foreign object such as a finger contacts on upper portion of the display device 1, the touch pressure caused by the contact is transferred to the second touch sensor and the elastic layer 40 is deformed.

As shown in FIG. 5, a thickness of the elastic layer 40 is reduced so the capacitance of the sensing capacitor formed by the pressure sensing electrode 420 and the upper conductor 62 with the elastic layer 40 as a dielectric material becomes second capacitance Cp' that is greater than the first capacitance Cp.

The driver connected to the second touch sensor senses intensity of the touch pressure according to a difference between the first capacitance Cp and the second capacitance Cp'. That is, as the difference between the first capacitance Cp and the second capacitance Cp' becomes greater, it is determines that the touch pressure is strong.

Since the pressure sensing electrode 420 which forms the second touch sensor is provided on the same layer as the first touch sensor 410 for sensing a touch position, there is no need to additionally form an electrode layer for the second touch sensor. The elastic layer 40 which forms the second touch sensor may also function as a polarizer so that there is also no need to add a polarizer. Thus, it is possible to reduce the manufacturing processes and production cost. Further, by minimizing additional layers to form the second touch sensor for sensing the pressure, the thickness of the display device may be reduced.

The touch position and the touch pressure are precisely sensed through the first touch sensor 410 and the second touch sensor to provide the display device 1 including a hybrid touch sensor with improved touch performance.

Referring to FIG. 1, the display device 1 according to an exemplary embodiment of the inventive concept further includes a cover window 500 provided on the touch sensor unit. The cover window 500 is formed of an insulating material such as plastic or glass. The cover window 500 may be flexible or rigid. A surface of the cover window 500 is a touch surface of the display device 1 contacted by the foreign object.

A light blocking member 501 is provided on an edge on a lower side of the cover window 500. The light blocking member 501 exposes the display area or the touch region (VA) of the display panel 300 and covers the peripheral area (BA) so that the peripheral area (BA) may not be visible from the outside.

The cover window 500 is attached to the elastic layer 40 through an adhesive 60 such as an optical clear adhesive (OCA), an optical clear resin (OCR), or a pressure sensitivity adhesive (PSA). The adhesive 60 is provided in a region in which the upper conductor 62 is not provided, and the upper conductor 62 may prevent the adhesive 60 from flowing outside. Because the upper conductor 62 surrounds the adhesive 60 and prevents the adhesive from flowing to the outside of the upper conductor, an additional sealing process for preventing the adhesive 60 from flowing to the outside of the upper conductor may be omitted. The upper conductor 62 may have a same thickness as the adhesive 60.

The upper conductor 62 according to another exemplary embodiment of the inventive concept may be directly formed on a lower surface of the cover window 500. However, the upper conductor 62 may be formed on a lower surface of the cover window 500 with intervening layers.

A display device including a touch sensor according to an exemplary embodiment of the inventive concept will now be described with reference to FIG. 6 together with the above-described drawings. Like constituent elements which are described in the exemplary embodiment above will have like reference numerals and no repeated descriptions will be provided.

Figure 6:
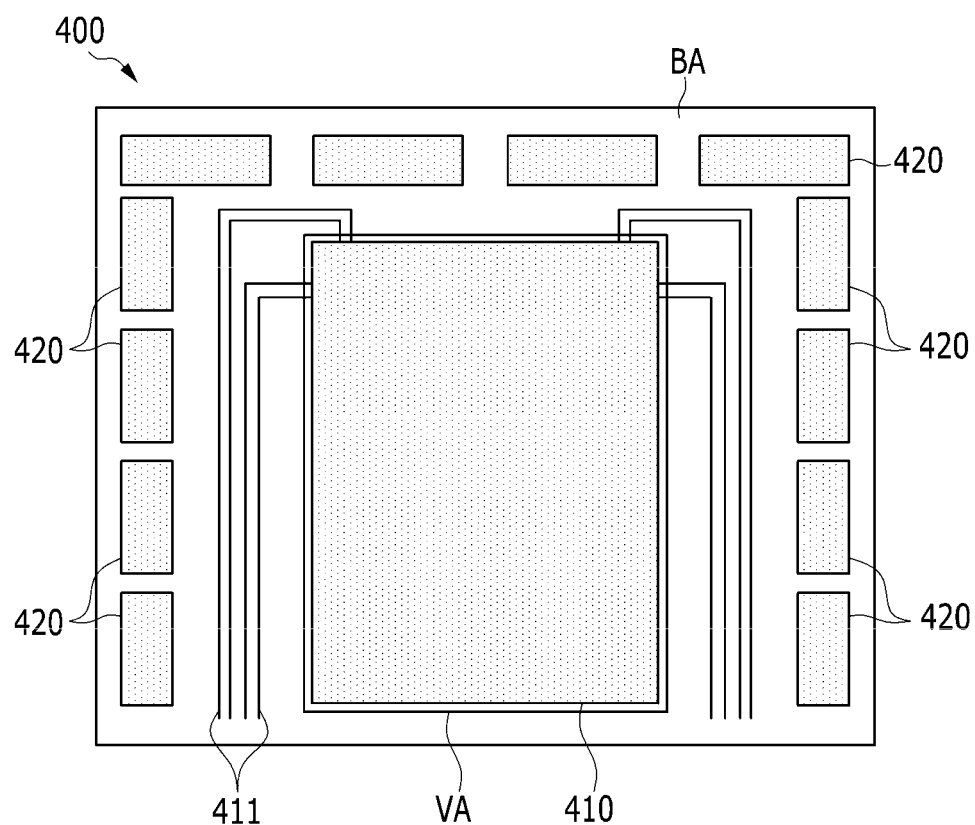
FIG. 6 shows a layout view of a sensing electrode layer of a touch sensor unit included by a display device according to an exemplary embodiment of the inventive concept.

FIG. 6 shows a layout view of a sensing electrode layer of a touch sensor unit included in a display device according to an exemplary embodiment of the inventive concept.

Referring to FIG. 6, the display device 1 mostly corresponds to the exemplary embodiment described with reference to FIG. 1 and FIG. 2, and has a different configuration of the pressure sensing electrode 420 included in the sensing electrode layer 400.

A plurality of pressure sensing electrodes 420 are provided on one side of the peripheral area (BA). FIG. 6 shows an example in which four pressure sensing electrodes 420 are disposed on one side of the peripheral area (BA), but it is not limited thereto. FIG. 6 also shows an example in which the pressure sensing electrodes 420 are provided on other sides of the four sides of the peripheral area (BA) except for the side in which the pad is provided, and without being restricted to this, at least one pressure sensing electrode 420 may be provided on any sides.

The plurality of pressure sensing electrodes 420 provided on one side of the peripheral area (BA) are separated from each other, and they are connected to a pad through a signal wire (not shown) to receive or transmit signals.

A display device including a touch sensor according to an exemplary embodiment of the inventive concept will now be described with reference to FIG. 7 and FIG. 8 together with the above-described drawings. Like constituent elements which are described in the exemplary embodiment will have like reference numerals and no repeated descriptions will be provided.

Figure 7:
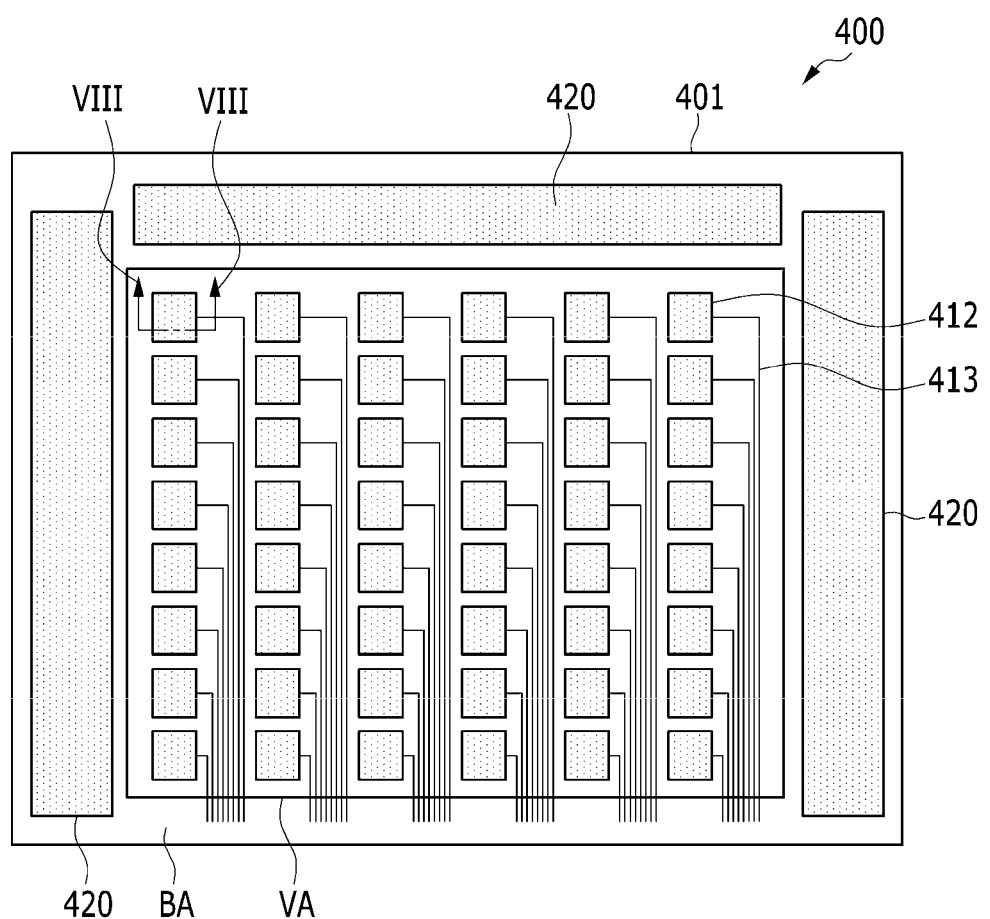
FIG. 7 shows a layout view of a sensing electrode layer of a touch sensor unit included by a display device according to an exemplary embodiment of the inventive concept.
Figure 8:
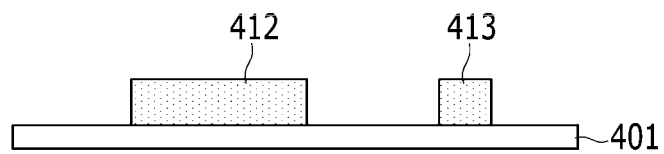
FIG. 8 shows a cross-sectional view of a sensing electrode layer shown in FIG. 7 with respect to a line VIII-VIII.

FIG. 7 shows a layout view of a sensing electrode layer of a touch sensor unit included by a display device according to an exemplary embodiment of the inventive concept, and FIG. 8 shows a cross-sectional view of a sensing electrode layer shown in FIG. 7 with respect to a line VIII-VIII.

Referring to FIG. 7 and FIG. 8, the display device 1 according to an exemplary embodiment of the inventive concept mostly corresponds to the exemplary embodiment described with reference to FIG. 1, FIG. 2, or FIG. 6. FIG. 7 and FIG. 8 shows a detailed example of the first touch sensor 410 included in the sensing electrode layer 400.

The first touch sensor 410 according to the present exemplary embodiment includes a plurality of touch electrodes 412 formed on a layer of a capacitive type touch sensor. The touch electrodes 412 are formed by using a mask.

Each touch electrode 412 is connected to the pad through a signal wire 413. The signal wire 413 inputs the input signal to the touch electrode 412 or outputs the output signal to the driver through the pad. The signal wire 413 is not provided in the peripheral area (BA) and extends in a perpendicular direction in the touch region (VA), and is provided on a lower side of the touch region (VA). Therefore, a right-to-left width of the peripheral area (BA) may be further reduced.

Referring to FIG. 8, the signal wire 413 may be provided on the same layer as the touch electrode 412, but is not limited thereto. The signal wire 413 is formed with the same material as the touch electrode 412 through the same process. The signal wire 413 can be formed with a different material from the touch electrode 412.

The touch electrode 412 and the signal wire 413 are provided on the substrate 401 of the display panel 300 or an additional circuit board.

The touch electrode 412 according to the present exemplary embodiment receives a sensing input signal through the signal wire 413 and is charged with a predetermined amount of charges. When there is a contact caused by a foreign object such as a finger, the stored amount of charges of the self-sensing capacitor is changed and a sensing output signal that is different from the input sensing input signal is output. Contact information such as a contact state or a contact position is known by the change of the sensing output signal.

A display device including a touch sensor according to an exemplary embodiment of the inventive concept will now be described with reference to FIG. 9 to FIG. 14 together with the above-described drawings. Like constituent elements which are described in the exemplary embodiment above will have like reference numerals and no repeated descriptions will be provided.

FIG. 9 to FIG. 14 show cross-sectional views of a display device including a touch sensor according to an exemplary embodiment of the inventive concept.

Figure 9:
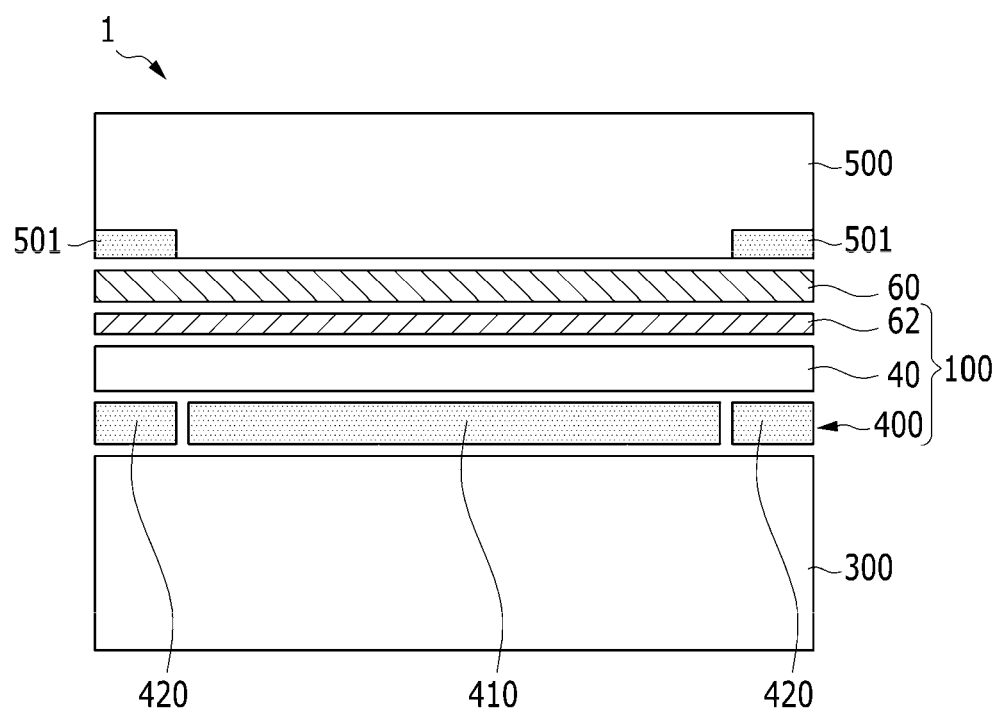
FIGS. 9, 10, 11, 12, 13 and 14 show cross-sectional views of a display device including a touch sensor according to an exemplary embodiment of the inventive concept.

Referring to FIG. 9, the display device 1 according to the present exemplary embodiment mostly corresponds to the display device 1 according to the above-described exemplary embodiment, and configurations of the touch sensor unit 100 and the adhesive 60 are different.

The touch sensor unit 100 according to the present exemplary embodiment includes a sensing electrode layer 400, an elastic layer 40, and an upper conductor 62.

The sensing electrode layer 400 is provided on the display panel 300. The sensing electrode layer 400 includes a first touch sensor 410 for sensing a touch position when a contact or an access by a foreign object is provided, and a second touch sensor which is pressure sensing electrodes 420 for sensing a touch pressure caused by the contact by the foreign object. The pressure sensing electrode 420 may be provided on the same layer as the first touch sensor 410, and in detail it may be provided in the same layer as the touch electrode of the first touch sensor 410.

The pressure sensing electrode 420 is provided in the peripheral area (BA) that surrounds the touch region (VA).

The upper conductor 62 according to the present exemplary embodiment can be provided in the touch region (VA) and the peripheral area (BA) of the elastic layer 40. That is, the upper conductor 62 includes a portion that faces the pressure sensing electrode 420 of the sensing electrode layer 400, and can also include a portion that faces the touch electrode of the first touch sensor 410.

The upper conductor 62 may be directly formed on the elastic layer 40. However, the upper conductor 62 may be formed on the elastic layer 40 with intervening layers.

The elastic layer 40 is provided between the upper conductor 62 and the sensing electrode layer 400. The elastic layer 40 according to an exemplary embodiment of the inventive concept is an elastic polarizer and overlaps the display area of the display panel 300.

The pressure sensing electrode 420, the elastic layer 40, and the upper conductor 62 form a second touch sensor that is a pressure sensor.

The display device 1 according to an exemplary embodiment of the inventive concept further includes a cover window 500 provided on the display panel 300. The cover window 500 is attached to the upper conductor 62 through the adhesive 60 such as OCA, OCR, or PSA. The adhesive 60 is formed on a front of the upper conductor 62.

Figure 10:
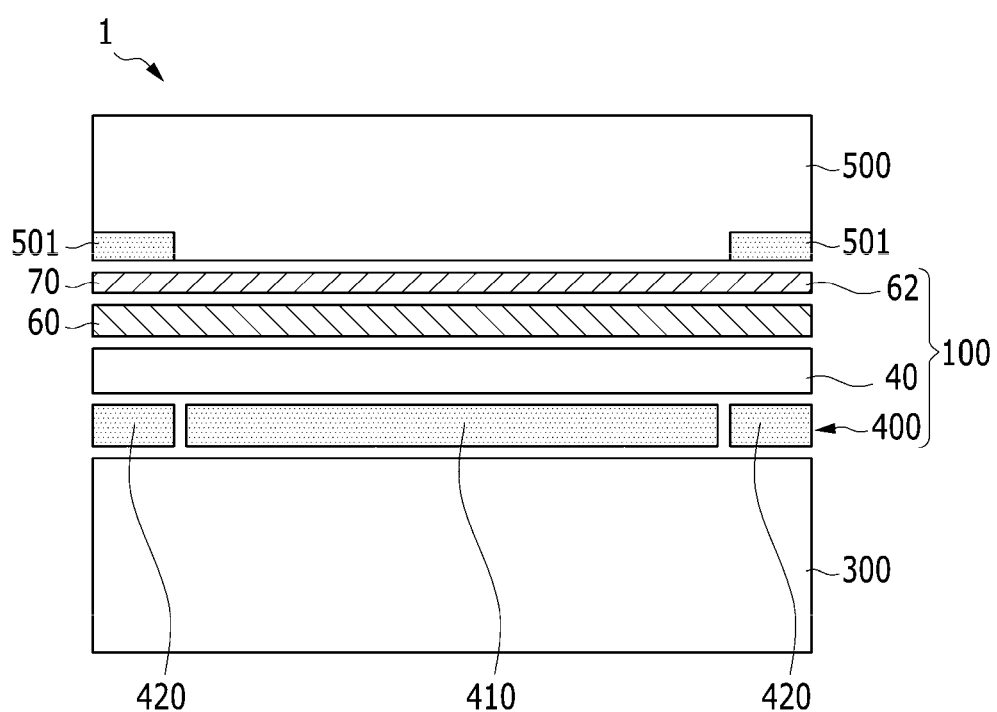

Referring to FIG. 10, the display device 1 according to the present exemplary embodiment mostly corresponds to the display device 1 according to the above-described exemplary embodiment, and configurations of the touch sensor unit 100 and the adhesive 60 are different.

The touch sensor unit 100 according to the present exemplary embodiment includes a sensing electrode layer 400, an elastic layer 40, an upper conductor 62, and an adhesive 60.

The sensing electrode layer 400 is provided on the display panel 300. The sensing electrode layer 400 includes a first touch sensor 410 for sensing a touch position when there is a contact or an access by a foreign object, and a second touch sensor which is pressure sensing electrode 420 for sensing a touch pressure caused by the contact of the foreign object. The pressure sensing electrode 420 may be provided on the same layer as the first touch sensor 410, and in detail, it may be provided in the same layer as the touch electrode of the first touch sensor 410. The pressure sensing electrode 420 is provided in the peripheral area (BA) that surrounds the touch region (VA).

The upper conductor 62 may be provided on the entire surface of the bottom surface of the cover window 500, that is, the touch region (VA) and the peripheral area (BA). That is, the upper conductor 62 includes a portion that faces the pressure sensing electrode 420 of the sensing electrode layer 400, and also includes a portion that faces the touch electrode of the first touch sensor 410.

The upper conductor 62 may be directly formed on the bottom surface of the cover window 500. However, the upper conductor 62 may be formed on the bottom surface of the cover window 500 with intervening layers.

The elastic layer 40 is provided between the upper conductor 62 and the sensing electrode layer 400. The elastic layer 40 may be an elastic polarizer and overlap the display area of the display panel 300.

The cover window 500 on which the upper conductor 62 is formed is attached to the elastic layer 40 through the adhesive 60 such as OCA, OCR, or PSA. The adhesive 60 is formed on the entire side of the bottom of the upper conductor 62.

The pressure sensing electrode 420, the elastic layer 40, and the upper conductor 62 form a second touch sensor that is a pressure sensor.

Figure 11:
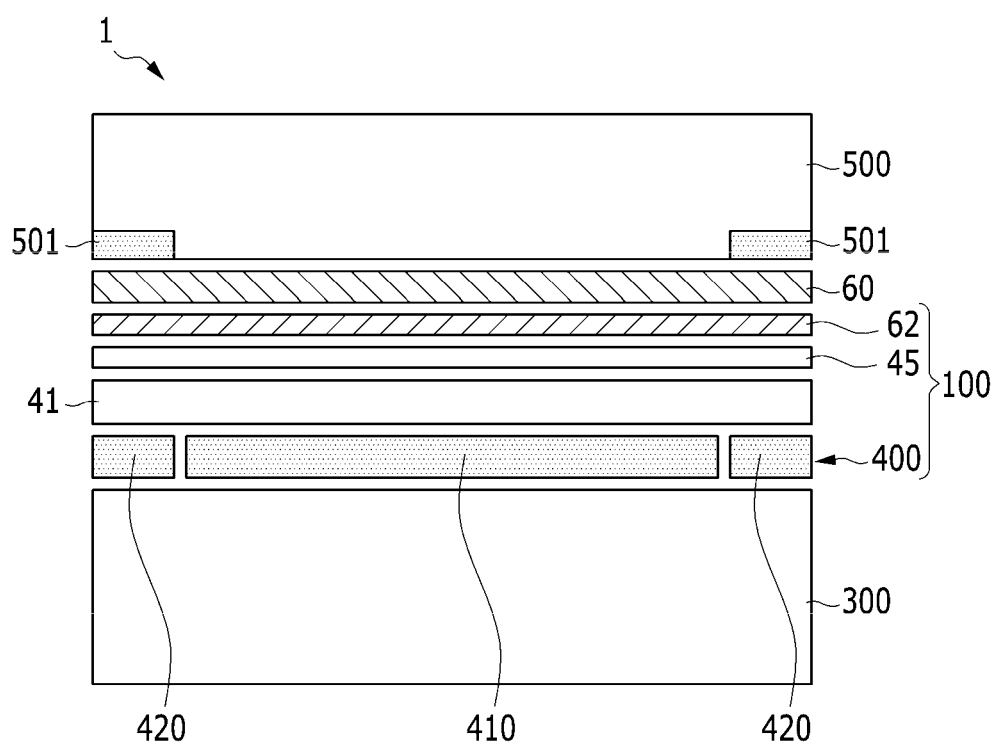

Referring to FIG. 11, the display device 1 according to the present exemplary embodiment mostly corresponds to the display device 1 according to the above-described exemplary embodiment, and configurations of the touch sensor unit 100 and the adhesive 60 are different.

The touch sensor unit 100 according to the present exemplary embodiment includes a sensing electrode layer 400, an elastic layer 45, and an upper conductor 62.

The sensing electrode layer 400 is provided on the display panel 300. The sensing electrode layer 400 includes a first touch sensor 410 for sensing a touch position when there is a contact or an access by a foreign object, and a second touch sensor which is a pressure sensing electrode 420 for sensing a touch pressure caused by the contact of the foreign object. The pressure sensing electrode 420 may be provided on the same layer as the first touch sensor 410, and in detail, it may be provided in the same layer as the touch electrode of the first touch sensor 410. The pressure sensing electrode 420 is provided in the peripheral area (BA) that surrounds the touch region (VA).

The upper conductor 62 is provided on the entire side of the elastic layer 45, that is, the touch region (VA) and the peripheral area (BA). That is, the upper conductor 62 includes a portion that faces the pressure sensing electrode 420 of the sensing electrode layer 400, and also includes a portion that faces the touch electrode of the first touch sensor 410.

However, differing from the drawing, the upper conductor 62 may only be provided on a portion that faces the pressure sensing electrode 420 of the sensing electrode layer 400. In this case, the upper conductor 62 is provided in the peripheral area (BA).

The upper conductor 62 is directly formed on the elastic layer 45. However, the upper conductor 62 may be formed on the elastic layer 45 with intervening layers.

The elastic layer 45 is provided between the upper conductor 62 and the sensing electrode layer 400. The elastic layer 45 has an elastic force by which it is compressed by an external pressure and is restored to its original state when the pressure is gone. The elastic layer 45 is provided on the entire side of the bottom of the upper conductor 62, and without being restricted to this, it can be formed in a region that faces the pressure sensing electrode 420.

The pressure sensing electrode 420, the elastic layer 45, and the upper conductor 62 forms a second touch sensor that is a pressure sensor.

The display device 1 according to an exemplary embodiment of the inventive concept further includes a polarizer 41 provided on the display panel 300. When the display panel 300 is a liquid crystal panel, the polarizer passes light of a specific polarization and blocks light of other polarizations, thus enables the liquid crystal panel 300 to display a desired image. When the display panel 300 is an organic light emitting panel, the polarizer 41 reduces reflection of external light to increase the quality of the displaying image.

The polarizer 41 is provided between the elastic layer 45 and the sensing electrode layer 400, and without being restricted to this, it can be provided between other layers.

According to the present exemplary embodiment, the elastic layer 45 is additionally formed. In this instance, the polarizer 41 may have little elasticity.

The display device 1 according to an exemplary embodiment of the inventive concept further includes a cover window 500 provided on the display panel 300. The cover window 500 is attached to the upper conductor 62 through the adhesive 60 such as OCA, OCR, or PSA. The adhesive 60 is formed on the entire side of the upper conductor 62.

Figure 12:
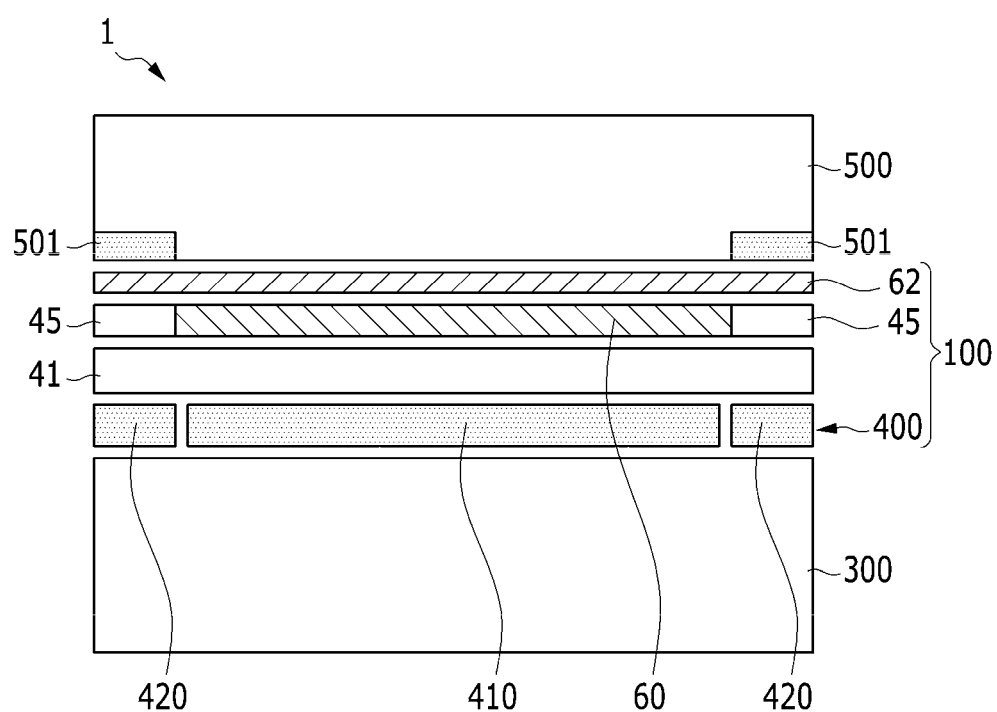

Referring to FIG. 12, the display device 1 according to the present exemplary embodiment mostly corresponds to the display device 1 according to the above-described exemplary embodiment, particularly the display device 1 according to the exemplary embodiment shown in FIG. 10, and configurations of the touch sensor unit 100 and adhesive 60 are different.

The touch sensor unit 100 according to the present exemplary embodiment includes a sensing electrode layer 400, an elastic layer 45, an upper conductor 62, and an adhesive 60.

The sensing electrode layer 400 is provided on the display panel 300. The sensing electrode layer 400 includes a first touch sensor 410 for sensing a touch position when there is a contact or an access is generated by a foreign object, and a second touch sensor which is pressure sensing electrode 420 for sensing a touch pressure caused by the contact of the foreign object. The pressure sensing electrode 420 may be provided on a same layer as the first touch sensor 410, and in detail, it may be provided in the same layer as the touch electrode of the first touch sensor 410. The pressure sensing electrode 420 is provided in the peripheral area (BA) that surrounds the touch region (VA).

The upper conductor 62 is provided on the entire bottom surface of the cover window 500, that is, the touch region (VA) and the peripheral area (BA). That is, the upper conductor 62 includes a portion that faces the pressure sensing electrode 420 of the sensing electrode layer 400, and can also include a portion that faces the touch electrode of the first touch sensor 410.

The upper conductor 62 may be directly formed on the bottom surface of the cover window 500. However, the upper conductor 62 may be formed on the bottom surface of the cover window 500 with intervening layers.

The elastic layer 45 is provided between the upper conductor 62 and the sensing electrode layer 400. The elastic layer 45 has an elastic force by which it is compressed by an external pressure and is restored to its original state when the pressure is gone. The elastic layer 45 is formed in a region that faces the pressure sensing electrode 420 or the peripheral area (BA).

The pressure sensing electrode 420, the elastic layer 45, and the upper conductor 62 form a second touch sensor that is a pressure sensor.

The display device 1 according to an exemplary embodiment of the inventive concept further includes a polarizer 41 provided on the display panel 300. The polarizer 41 is provided between the sensing electrode layer 400 and the elastic layer 45, and without being restricted to this, it can be provided between other layers.

The elastic layer 45 is additionally formed separately from the polarizer 41 according to the present exemplary embodiment. In this instance, the polarizer 41 ay have little elasticity.

The cover window 500 on which the upper conductor 62 is formed is attached to the elastic layer 45 through the adhesive 60 such as OCA, OCR, or PSA. The adhesive 60 is formed on part of the region that is below the upper conductor 62. In detail, the adhesive 60 is provided in the region where the elastic layer 45 is not provided, and the elastic layer 45 prevents the adhesive 60 from being flowing to an outside of the elastic layer 45. Therefore, the additional sealing process for preventing the adhesive 60 from flowing to an outside of the elastic layer 45 is omitted. The elastic layer 45 may be provided substantially in the same layer as the adhesive 60.

Figure 13:
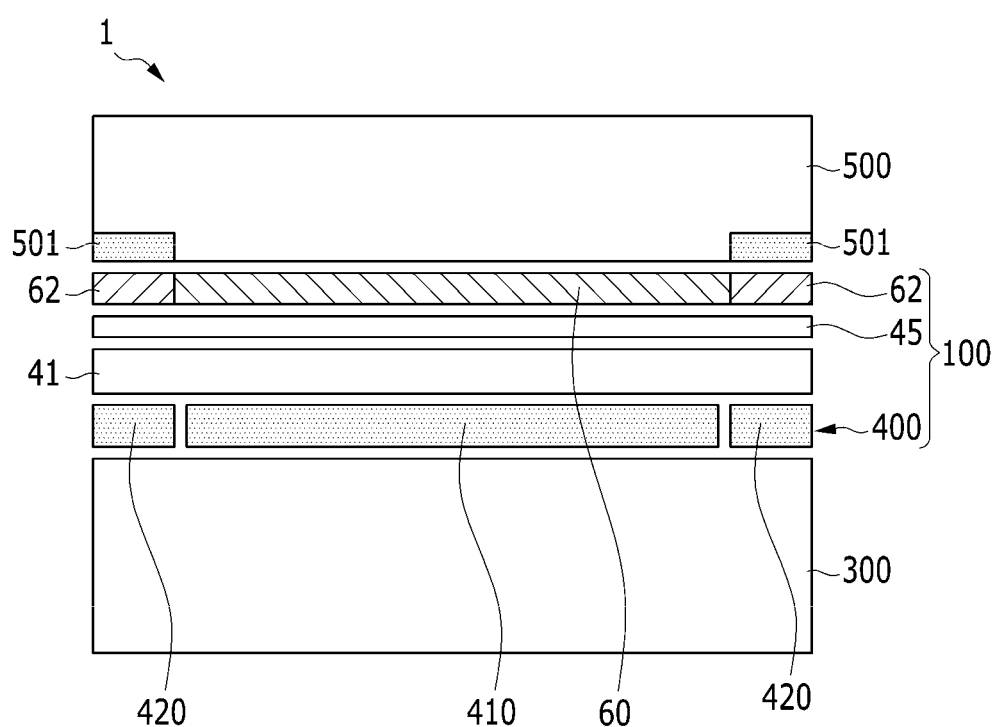

Referring to FIG. 13, the display device 1 according to the present exemplary embodiment mostly corresponds to the display device 1 according to the exemplary embodiment, particularly the display device 1 according to an exemplary embodiment shown with reference to FIG. 1, and a configuration of the touch sensor unit 100 is different.

The touch sensor unit 100 according to the present exemplary embodiment includes a sensing electrode layer 400, an elastic layer 45, and an upper conductor 62.

The present exemplary embodiment includes an elastic layer 45 formed on the entire side of the sensing electrode layer 400, differing from the exemplary embodiment shown with reference to FIG. 1. The elastic layer 45 is provided between the upper conductor 62 and the sensing electrode layer 400. The elastic layer 45 has an elastic force by which it is compressed by an external pressure and is restored to its original state when the pressure is gone.

The upper conductor 62 and the adhesive 60 are provided on the elastic layer 45.

The upper conductor 62 is directly formed on the elastic layer 45. However, the upper conductor 62 may be formed on the elastic layer 45 with intervening layers.

The pressure sensing electrode 420, the elastic layer 45, and the upper conductor 62 forms a second touch sensor that is a pressure sensor.

The display device 1 according to an exemplary embodiment of the inventive concept further includes a polarizer 41 provided on the display panel 300. The polarizer 41 is provided between the elastic layer 45 and the sensing electrode layer 400, and without being restricted to this, it can be provided between other layers.

The elastic layer 45 is formed in addition to the polarizer 41 according to the present exemplary embodiment. In this instance, the polarizer 41 may have little elasticity.

The display device 1 according to an exemplary embodiment of the inventive concept may further include a cover window 500 provided on the display panel 300. The cover window 500 is attached to the elastic layer 45 through the adhesive 60 such as OCA, OCR, or PSA. The adhesive 60 is mainly provided in the region where the upper conductor 62 is not provided from among the region provided on the elastic layer 45, and the upper conductor 62 may prevent the adhesive 60 from being flowing outside. Therefore, an additional sealing process for preventing the adhesive 60 from being flowing outside may be omitted. The upper conductor 62 may be provided substantially in the same layer as the adhesive 60.

According to another exemplary embodiment of the inventive concept, the upper conductor 62 may be directly formed on the bottom surface of the cover window 500. However, the upper conductor 62 may be formed on the bottom surface of the cover window 500 with intervening layers.

Figure 14:
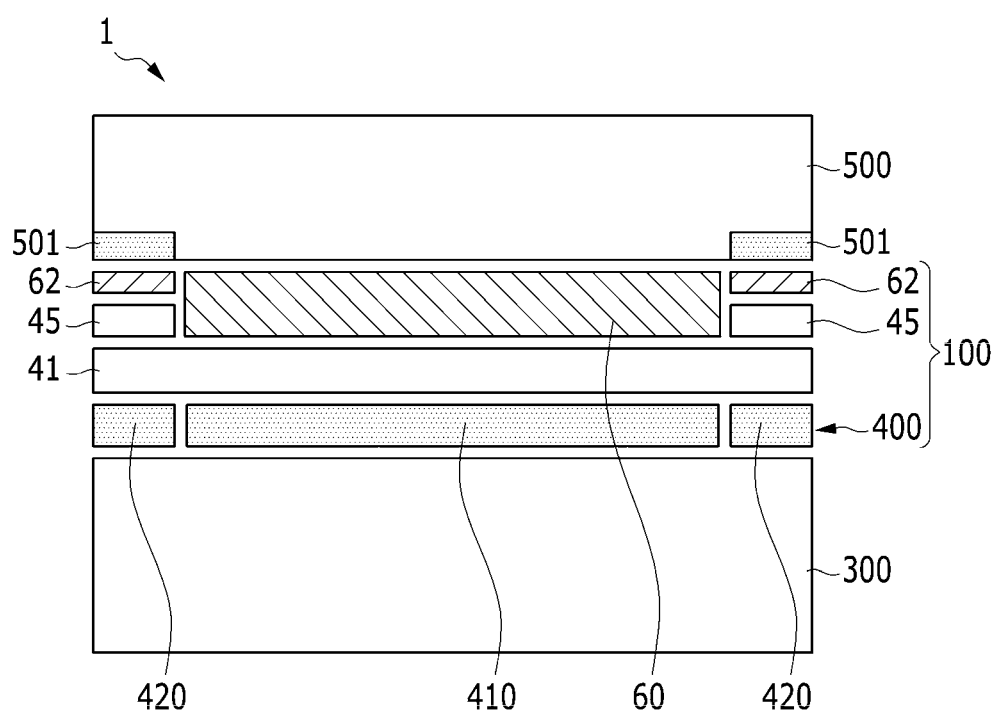

Referring to FIG. 14, the display device 1 according to the present exemplary embodiment mostly corresponds to the display device 1 according to the above-described exemplary embodiment, particularly the display device 1 according to an exemplary embodiment shown in FIG. 13, and a configuration of the elastic layer 45 is different.

The touch sensor unit 100 according to the present exemplary embodiment includes a sensing electrode layer 400, an elastic layer 45, and an upper conductor 62.

Differing from the exemplary embodiment shown in FIG. 13, the elastic layer 45 is not provided on the entire side of the sensing electrode layer 400, but it can be formed on the portion that faces the pressure sensing electrode 420 or the upper conductor 62 in the present exemplary embodiment. That is, the elastic layer 45 is provided not in the touch region (VA) but in the peripheral area (BA).

The upper conductor 62 is provided on the elastic layer 45. The upper conductor 62 is directly formed on the elastic layer 45. However, the upper conductor 62 may be formed on the elastic layer 450 with intervening layers.

The display device 1 according to an exemplary embodiment of the inventive concept further includes a cover window 500 provided on the display panel 300. The cover window 500 is attached to the sensing electrode layer 400 through the adhesive 60 such as OCA, OCR, or PSA. The adhesive 60 is provided on a region where the elastic layer 45 and the upper conductor 62 are not provided. The upper conductor 62 and the elastic layer 45 prevent the adhesive 60 from flowing to the outside of the upper conductor 62 and the elastic layer 45. The upper conductor 62 and the elastic layer 45 may be provided substantially in the same layer as the adhesive 60. Therefore, the additional sealing process for preventing the adhesive 60 from flowing to the outside of the upper conductor 62 and the elastic layer 45 is omitted. The upper conductor 62 and the elastic layer 45 do not overlap the adhesive 60.

The upper conductor 62 may be directly formed on the bottom surface of the cover window 500. However, the upper conductor 62 may be formed on the bottom surface of the cover window 500 with intervening layers.

The pressure sensing electrode 420, the elastic layer 45, and the upper conductor 62 form a second touch sensor that is a pressure sensor.

The display device 1 according to an exemplary embodiment of the inventive concept may further include a polarizer 41 provided on the display panel 300. The polarizer 41 is provided between the elastic layer 45 and the sensing electrode layer 400, and without being restricted to this, it can be provided between other layers.

The elastic layer 45 is additionally formed separately from the polarizer 41 according to the present exemplary embodiment. In this instance, the polarizer 41 may have little elasticity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a display panel for displaying an image; and
a touch sensor unit provided on the display panel,
wherein the touch sensor unit includes a sensing electrode layer including a first touch sensor and a pressure sensing electrode, a conductor, and an elastic layer provided between the sensing electrode layer and the conductor,
the first touch sensor includes a plurality of touch electrodes for sensing a touch position, the plurality of touch electrodes including a transparent conductive material,
the pressure sensing electrode, the conductor, and the elastic layer form a second touch sensor for sensing a touch pressure,
the elastic layer is provided both in a touch region and a peripheral area that is around the touch region, and includes a portion disposed over the plurality of touch electrodes of the first touch sensor, and
the plurality of touch electrodes and the pressure sensing electrode are provided on a same layer.

2. The display device of claim 1, wherein
the plurality of touch electrodes are provided in the touch region facing a display area in which the display panel displays an image, and
the pressure sensing electrode is provided in the peripheral area.

3. The display device of claim 2, wherein
the elastic layer has a polarization function includes an elastic polarizer.

4. The display device of claim 3, wherein the conductor is provided in the peripheral area.

5. The display device of claim 4, further comprising a cover window attached to the touch sensor unit through an adhesive,
wherein the adhesive does not overlap the conductor.

6. The display device of claim 3, wherein the conductor is provided in the peripheral area and the touch region.

7. The display device of claim 6, further comprising a cover window attached to the touch sensor unit through an adhesive,
wherein the adhesive is provided between the conductor and the cover window.

8. The display device of claim 6, further comprising a cover window attached to the touch sensor unit through an adhesive,
wherein the conductor is formed on a bottom surface of the cover window, and
the adhesive is provided between the conductor and the elastic layer.

9. The display device of claim 2, further comprising a polarizer overlapping the elastic layer.

10. The display device of claim 9, wherein the conductor is provided in the peripheral area and the touch region.

11. The display device of claim 10, further comprising a cover window attached to the touch sensor unit through an adhesive,
wherein the adhesive is provided between the conductor and the cover window.

12. The display device of claim 11, wherein the elastic layer and the polarizer are provided between the conductor and the sensing electrode layer.

13. The display device of claim 9, wherein the conductor is provided in the peripheral area.

14. The display device of claim 13, further comprising a cover window attached to the touch sensor unit through an adhesive,
wherein the adhesive is provided between the elastic layer and the cover window and does not overlap the conductor.

15. The display device of claim 2, wherein the elastic layer is provided in the peripheral area.

16. The display device of claim 15, wherein the conductor is provided in the peripheral area and the touch region.

17. The display device of claim 16, further comprising a cover window attached to the touch sensor unit through an adhesive,
wherein the conductor is provided on a bottom surface of the cover window, and
the adhesive is provided between the conductor and the sensing electrode layer and in a region where the elastic layer is provided.

18. The display device of claim 17, further comprising a polarizer overlapping the display area.

19. The display device of claim 15, further comprising a cover window attached to the touch sensor unit through an adhesive and a polarizer overlapping the display area,
wherein the conductor is provided in the peripheral area, the conductor is formed on a bottom surface of the cover window, and
the adhesive does not overlap the conductor and the elastic layer.

* * * * *